(12) United States Patent
Simeral

(10) Patent No.: US 9,823,990 B2
(45) Date of Patent: Nov. 21, 2017

(54) SYSTEM AND PROCESS FOR ACCOUNTING FOR AGING EFFECTS IN A COMPUTING DEVICE

(75) Inventor: Brad Simeral, San Francisco, CA (US)

(73) Assignee: Nvidia Corporation, Santa Clara, CA (US)

(*) Notice: Subject to any disclaimer, the term of this patent is extended or adjusted under 35 U.S.C. 154(b) by 136 days.

(21) Appl. No.: 13/604,283

(22) Filed: Sep. 5, 2012

(65) Prior Publication Data

US 2014/0068298 A1    Mar. 6, 2014

(51) Int. Cl.
| | | |
|---|---|---|
| *G06F 11/30* | (2006.01) | |
| *G06F 17/50* | (2006.01) | |
| *G06F 11/34* | (2006.01) | |
| *G01R 31/00* | (2006.01) | |
| *G06F 17/00* | (2006.01) | |
| *G01R 31/28* | (2006.01) | |

(52) U.S. Cl.
CPC ...... *G06F 11/3058* (2013.01); *G06F 11/3003* (2013.01); *G06F 11/3409* (2013.01); *G06F 17/5009* (2013.01); *G01R 31/00* (2013.01); *G01R 31/2855* (2013.01); *G06F 17/00* (2013.01); *G06F 2217/76* (2013.01)

(58) Field of Classification Search
CPC ............. G06F 11/3058; G06F 11/3003; G06F 11/3409; G06F 17/5009
USPC ...................................................... 714/47.1
See application file for complete search history.

(56) References Cited

U.S. PATENT DOCUMENTS

| | | | |
|---|---|---|---|
| 3,449,629 A * | 6/1969 | Wigert | G05D 23/1902 |
| | | | 219/502 |
| 4,707,796 A * | 11/1987 | Calabro et al. | 702/34 |
| 5,025,387 A | 6/1991 | Frane | |
| 5,155,840 A | 10/1992 | Niijima | |
| 5,237,460 A | 8/1993 | Miller et al. | |
| 5,465,367 A | 11/1995 | Reddy et al. | |
| 5,905,867 A | 5/1999 | Giorgio | |
| 6,393,570 B1 | 5/2002 | Henderson et al. | |
| 6,523,102 B1 | 2/2003 | Dye et al. | |
| 6,545,684 B1 | 4/2003 | Dragony et al. | |
| 6,704,022 B1 | 3/2004 | Aleksic | |
| 6,768,351 B1 | 7/2004 | Davis | |
| 6,772,352 B1 | 8/2004 | Williams et al. | |
| 6,816,978 B1 | 11/2004 | Kaminski et al. | |
| 6,832,177 B2 | 12/2004 | Khandekar et al. | |
| 6,903,564 B1 * | 6/2005 | Suzuki | 324/762.02 |
| 6,980,020 B2 | 12/2005 | Best et al. | |

(Continued)

FOREIGN PATENT DOCUMENTS

TW    200604540    2/2006

OTHER PUBLICATIONS

Johnson, Chris, "Graphics DDR3 On-Die Termination and Thermal Considerations." Micron Designline, vol. 12, Issue 1, Rev. Apr. 1, 2003. 8 pgs.

*Primary Examiner* — Matt Kim
*Assistant Examiner* — Paul Contino

(57) ABSTRACT

Embodiments of the claimed subject matter are directed to methods and systems that allow tracking and accounting of wear and other aging effects in integrated circuits and products which include integrated circuits over time, and the dynamic adjustment of operating conditions to increase or decrease wear in response to the accumulated wear relative to the expected wear during the lifetime of the circuit and/or product.

38 Claims, 5 Drawing Sheets

(56) References Cited

U.S. PATENT DOCUMENTS

| | | |
|---|---|---|
| 7,005,871 B1* | 2/2006 | Davies et al. ............. 324/750.3 |
| 7,034,565 B2 | 4/2006 | Lee |
| 7,036,030 B1* | 4/2006 | Altmejd ........................ 713/322 |
| 7,061,640 B1 | 6/2006 | Maeda |
| 7,111,179 B1* | 9/2006 | Girson et al. ................ 713/300 |
| 7,126,365 B2 | 10/2006 | Suzuki |
| 7,191,088 B1 | 3/2007 | Reed et al. |
| 7,228,508 B1* | 6/2007 | Pippin ........................... 716/136 |
| 7,259,585 B2 | 8/2007 | Brinkman et al. |
| 7,441,137 B1 | 10/2008 | Mimberg |
| 7,453,302 B2 | 11/2008 | Le et al. |
| 7,454,316 B2* | 11/2008 | Bose et al. .................... 702/186 |
| 7,475,320 B2* | 1/2009 | Knebel et al. ................ 714/746 |
| 7,495,519 B2* | 2/2009 | Kim et al. ....................... 331/44 |
| 7,495,985 B1 | 2/2009 | Reed et al. |
| 7,602,166 B1 | 10/2009 | Kang |
| 7,689,845 B2* | 3/2010 | Narendra et al. ............. 713/320 |
| 7,765,412 B1* | 7/2010 | Burr et al. .................... 713/300 |
| 7,797,506 B2* | 9/2010 | Rangarajan ............. G06F 1/206 365/211 |
| 7,813,204 B2 | 10/2010 | Reed et al. |
| 7,836,717 B2* | 11/2010 | Liao .................. G05D 23/1931 165/104.33 |
| 7,849,332 B1 | 12/2010 | Alben et al. |
| 7,882,369 B1* | 2/2011 | Kelleher et al. ............. 713/300 |
| 7,917,772 B1* | 3/2011 | Koniaris ............... G06F 1/3203 713/300 |
| 8,549,363 B2 | 10/2013 | Cher et al. |
| 8,671,170 B2* | 3/2014 | Frank et al. .................. 709/221 |
| 9,081,566 B2* | 7/2015 | Koniaris ................ G06F 1/3203 |
| 9,092,048 B1 | 7/2015 | Owen |
| 9,195,246 B2 | 11/2015 | Kahn et al. |
| 2004/0054938 A1* | 3/2004 | Belady et al. ................ 713/300 |
| 2004/0263212 A1 | 12/2004 | Wald |
| 2005/0144492 A1 | 6/2005 | Yun et al. |
| 2007/0186123 A1 | 8/2007 | Winbom |
| 2007/0211548 A1* | 9/2007 | Jain .......................... G11C 5/04 365/211 |
| 2008/0229127 A1 | 9/2008 | Felter et al. |
| 2010/0049466 A1* | 2/2010 | Casey ................ G06F 11/3058 702/130 |
| 2010/0117579 A1* | 5/2010 | Culbert ..................... G06F 1/20 318/471 |
| 2011/0205826 A1* | 8/2011 | Kuroda ................ G11C 11/406 365/222 |
| 2011/0265090 A1* | 10/2011 | Moyer .................. G06F 1/3203 718/103 |
| 2012/0023429 A1* | 1/2012 | Medhi ........................... 715/772 |
| 2012/0036398 A1* | 2/2012 | Moyer ................... G06F 9/505 714/48 |
| 2012/0209568 A1* | 8/2012 | Arndt et al. ................... 702/183 |
| 2012/0242392 A1* | 9/2012 | Kim ............................. 327/378 |
| 2013/0009700 A1 | 1/2013 | Deboy et al. |
| 2013/0124714 A1* | 5/2013 | Bednar ......................... 709/224 |
| 2013/0147526 A1 | 6/2013 | Kim et al. |
| 2013/0185584 A1 | 7/2013 | Hirairi |
| 2014/0176116 A1 | 6/2014 | Kumar et al. |
| 2015/0022272 A1 | 1/2015 | Felix et al. |

* cited by examiner

Exemplary Computer System 500

SYSTEM AND PROCESS FOR ACCOUNTING FOR AGING EFFECTS IN A COMPUTING DEVICE

BACKGROUND

Integrated circuits (IC) are miniaturized electronic circuits that are typically manufactured from a semiconductor material (often, silicon). Due to the reliability of integrated circuits and developments within the industry that allow ICs to be mass produced, the usage of integrated circuits has become ubiquitous in the manufacture of many commercial electronics equipment produced today and have contributed significantly to the proliferation and development of the electronics industry. ICs are often combined to form products including various devices or components which both comprise an underlying computing system, and are integrated as peripheral devices in the computing system.

IC developers typically design an IC with an intended lifetime (e.g., 5 years) before failure. During a typical design phase for an IC, an IC developer generally specifies the voltages and frequencies at which the IC or "chip" is going to operate with and/or under. However, these operating conditions (along with temperature) may contribute to aging effects that naturally occur with silicon or like-material based products. These conditions furthermore can change as aging effects and wear are accumulated by an IC product. For example, a product which requires a certain voltage to operate under a specific frequency at the beginning of the lifetime of the product may require a higher voltage to operate under the same frequency later in the lifetime of the product, due to the aging effect. Moreover, the operating conditions can fluctuate drastically and frequently, depending on usage of the underlying computing system—which, naturally, can vary from user to user. As a result, designing an IC with sufficient tolerances to last the intended lifespan under such wildly varying conditions can be a complex process.

Conventionally, the current process involved in designing ICs to survive under presumed operating conditions for an intended lifespan is to build in enough of a margin when an IC product is built to account for aging effects over the lifetime of the product under the approximately worst-case conditions. However, such a process is highly margined. That is, very few applications of an IC product would actually be using the device or product for 100% of the time under worst-case conditions for the entire lifetime of the product. By designing products with only these specific, highly margined conditions in mind, substantial power or performance can be wasted over the lifetime of a product.

One conventional solution to this problem is to consider a more reasonable worst-case scenario. That is, to consider the intended use of a product, and to design the product with typical conditions consistent with the intended use. For example, while an IC in a server lab or farm may operate under worst-case scenarios continuously, IC products in personal computers or laptops typically experience worst-case conditions much less frequently (e.g., when the computer is in use, and not-idle). However, even in such instances, actual usage of the computer can still vary significantly between users. For those IC products which are not used to the frequency or intensity of these planned conditions, even under a more reasonable worst-case scenario planning, computing resources may be consumed inefficiently and/or unnecessarily. Meanwhile, for the IC products that exceed the reasonable worst-case scenario, the risk of an early failure due to unforeseen aging effects may be increased.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to methods and systems that allow tracking and accounting of wear and other aging effects in integrated circuits and products which include integrated circuits over time, and the dynamic adjustment of operating conditions to increase or decrease wear in response to the accumulated wear relative to the expected wear during the lifetime of the circuit and/or product. The claimed embodiments not only maintain the expected lifetime of the product, but provide solutions customized for each user to operate with increased performance and/or resource efficiency.

According to an embodiment, a method is provided which determines an amount of wear in a computing system over time, calculates a number of accumulated credits representative of the difference in the amount of wear determined for the computing system relative to a worst-case or reasonable worst-case scenario, and adjusts operating conditions in the computing system based on the amount of determined wear and the number of accumulated credits.

According to an embodiment, determining the amount of wear expected on an IC in a computing system over time may be performed by actively monitoring the operating conditions and mapping the monitored conditions to an expected wear curve and calculating the difference. According to alternate embodiments, the expected wear on an IC may be directly measured using two or more circuits, such as oscillators, to periodically measure transistors which are isolated from voltage-induced aging.

Another embodiment provides a system in which the wear in a computing system is tracked or measured over time, and operating conditions in the system may be adjusted to accommodate the specific amount of wear induced in the system to increase performance.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
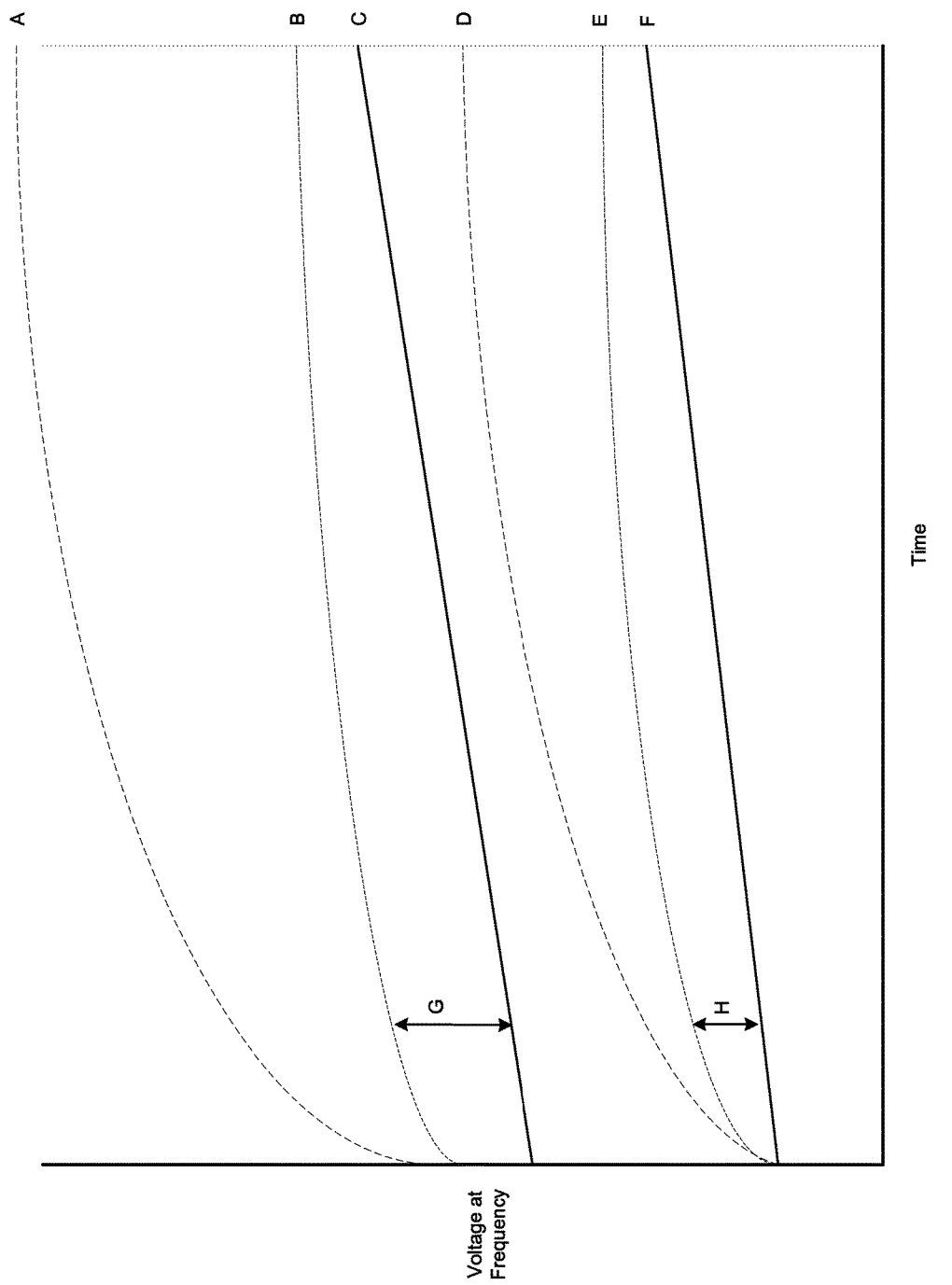
FIG. 1 depicts a line graph comparing exemplary operating conditions over time and the effect due to aging in an integrated circuit, in accordance with various embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are also presented and discussed in terms of a process. Although steps and sequencing thereof are disclosed in figures herein (e.g., FIGS. 1-3) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention are directed to provide methods and systems that allow for accounting of aging effects and wear in a computing system, and to adjust operating conditions to take advantage of a lack of wear relative to an expected level of wear. The claimed subject matter not only maintains the expected lifetime of an integrated circuit product, but efficiently adjusts operating conditions to increase performance when desired. Embodiments of the present invention and their benefits are further described below.

FIG. 1 depicts a line graph 100 comparing exemplary operating conditions over time and the effect due to aging in an integrated circuit or IC product, in accordance with various embodiments of the present invention. As depicted in FIG. 1, the y-axis of the line graph 100 represents the voltage necessary to operate at a constant frequency, whereas the x-axis of the line graph 100 represents time. FIG. 1 presents 3 scenarios, each with varying operating conditions. Lines A and D represent the worst-case conditions contemplated in conventional processes for IC tolerance design. Line A represents the maximum voltage in a system under such conditions that will allow the system to operate at a specific frequency. Line D represents the minimum voltage in a system necessary to maintain operation at the same frequency.

Lines B and E represent the "reasonable worst-case" conditions corresponding to expected conditions customized for intended use of an IC or IC product. Line B represents the maximum voltage in a system under such conditions that will allow the system to operate at a specific frequency. Line E represents the minimum voltage under such conditions in a system necessary to maintain operation at the same frequency.

Lines C and F represent a set of conditions for an exemplary individual user of an IC or IC product. Line C represents the maximum voltage in a system under such conditions that will allow the system to operate at a specific frequency. Line F represents the minimum voltage under such conditions in a system necessary to maintain operation at the same frequency. As presented in FIG. 1, actual usage of an IC or IC product can fluctuate significantly, and may not approximate typical smoothly curved lines expected and/or utilized during worst-case and reasonable-worst-case condition planning. Moreover, the differences (G and H) between the maximum and minimum voltages, respectively, between the exemplary usage lines C and F and the reasonable-worst-case conditions lines B and E represent the amount of wasted performance at the time which would be experienced under the exemplary usage. As can be seen, this difference only increases when compared to the absolute worst-case conditions (i.e., Lines A and D).

As depicted in FIG. 1, the voltage required to operate a system at a consistent frequency will increase over time. This is due to the aging effect, and the amount of wear experienced by an IC or IC product which can naturally lead to increased inefficiencies in the transportation, or processing of signals or other resources. In an embodiment, voltage may be provided by a power supply device, such as a power supply unit (PSU) of a computing system.

In an embodiment, frequency can refer to the clock rate of a processor, microprocessor, or processing unit (such as a CPU, GPU, etc.) in a computing system. According to an embodiment, the IC may refer to one or more integrated circuits or microchips comprised in a system, including, but not limited to, the ICs in a motherboard (central printed circuit board), other printed circuit boards (e.g., a video card, network interface card, sound card), or other peripheral devices in a computing system.

Figure 2:
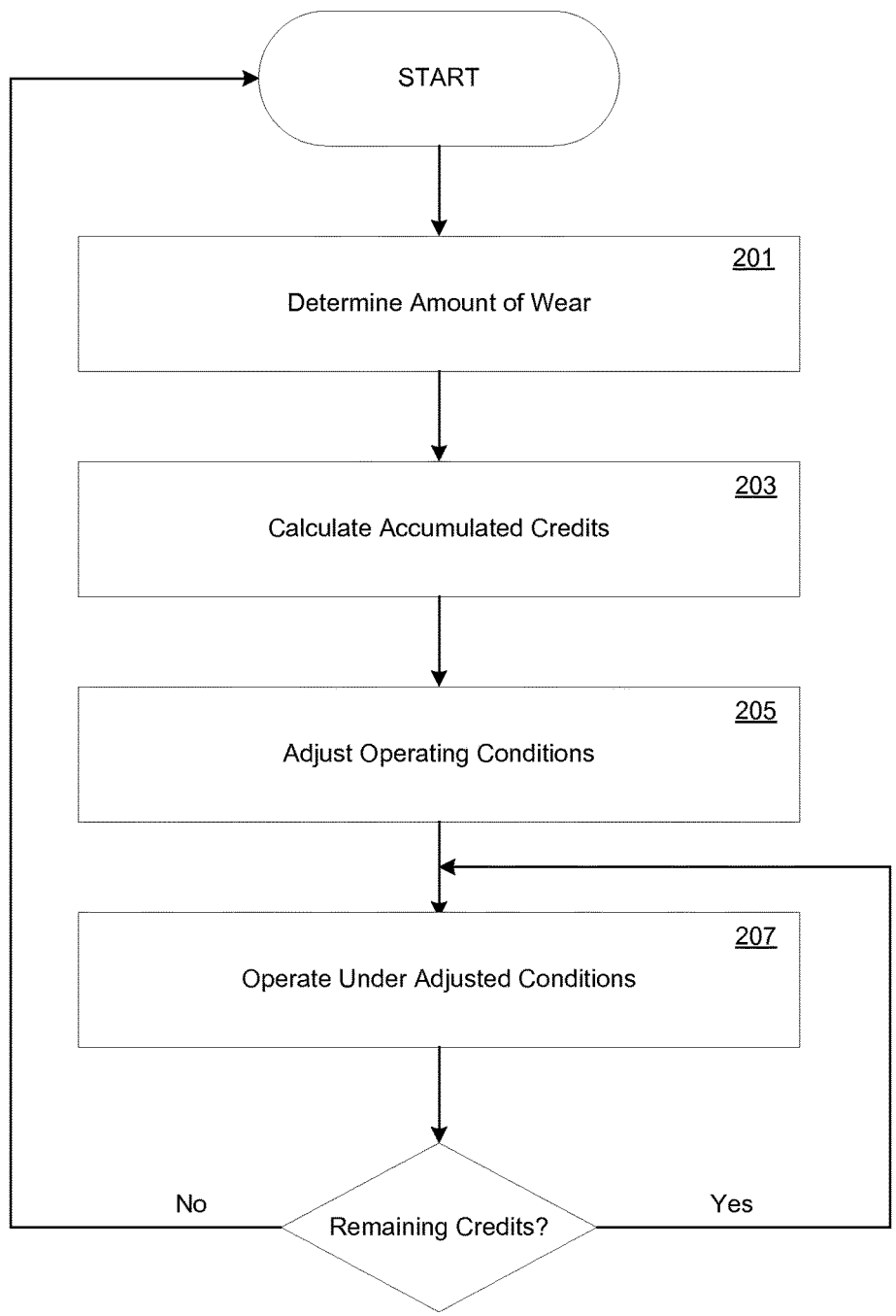
FIG. 2 depicts a flowchart of a process for adjusting operating conditions in a computing system to more efficiently allocate resources in response to an amount of determined wear, in accordance with various embodiments of the present invention.

FIG. 2 depicts a flowchart 200 of a process for adjusting operating conditions in a computing system to more efficiently allocate resources in response to an amount of determined wear, in accordance with various embodiments of the present invention. Steps 201-207 describe exemplary steps, which may be performed during the process depicted in FIG. 2.

At step 201, the amount of wear on one or more IC or IC products due to operating conditions in the underlying computing system is determined. The operating conditions may include, for example, a voltage, frequency, and/or temperature experienced during operation of the computing system. Alternatively, the amount of wear on all IC or IC products in a computing system may be determined at step 201. Determining the amount of wear in the IC or IC product may be performed according to various procedures. According to an embodiment, the amount of wear may be determined using specific devices. According to an alternate embodiment where the amount of wear cannot be directly measured, the amount of wear in an IC or IC product may be estimated by monitoring operating conditions in the computing product over time and comparing the monitored operating conditions to a reference set of operating conditions data. Each of these methods are described in greater detail below with respect to FIG. 3.

At step 203, a number of accumulated credits is calculated based on the estimated amount of wear expected due to operating conditions in the computing system as determined at step 201. The number of accumulated credits may, for example, represent the difference between the estimated amount of wear experienced in the computing system and the amount of wear under reference conditions. When the estimated amount of wear experienced in the computing system is less than the amount of wear under the reference conditions, a surplus amount of credits are accumulated, and represents an underutilization of the computing resources relative to a reference. Step 203 may be performed periodically.

At step 205, a performance level corresponding to a plurality of operating conditions may be adjusted to correspond with the number accumulated credits. For example, operating conditions may be adjusted to increase performance if a surplus of accumulated credits is determined. Performance may be increased by, for example, increasing the frequency (i.e., processing speed) while maintaining the same level of voltage. Alternatively, the frequency may be maintained while decreasing the level of voltage. In still further embodiments, both frequency and voltage may be increased during operation. Once adjusted, the computing system operates at a higher performance level, and under the new set of operating conditions at step 207. According to embodiments, increasing the performance level of a computing system consumes accumulated credits, and therefore, adjustment of the operating conditions may be performed only when a surplus of accumulated credits exists, and for only so long as a surplus of accumulated credits exists. Thus, the performance level may be automatically adjusted (e.g., decreased) when the surplus of accumulated credits is exhausted. In further embodiments, the performance level may not be increased beyond a neutral or base performance level (i.e., neither accumulating or consuming credits) until credits have been accumulated, as determined by performing step 203.

In an embodiment, credits are consumed when the performance level of the computing system is increased above a (pre-determined) threshold, while decreasing the performance level below the threshold accumulates credits. In still further embodiments, the rate at which credits are accumulated or consumed corresponds to the difference between the operating performance level and the threshold. Thus, operating at a performance level well in excess of the threshold would consume accumulated credits at a higher rate than operating a at performance level slightly above the threshold. In further embodiments, the threshold may correspond to a reference level of performance.

In still further embodiments, calculation of the number of accumulated credits may be performed with greater frequency when operating conditions are adjusted to increase performance. In still further embodiments, adjustment of operating conditions may be automatically initiated, either at a pre-determined time (e.g., beyond the lifetime of the IC or IC product), or in response to a trigger event. Alternatively, adjustment of operating conditions may be manually elected by the user of the computing system (e.g., through an on-screen graphical user interface).

Figure 3:
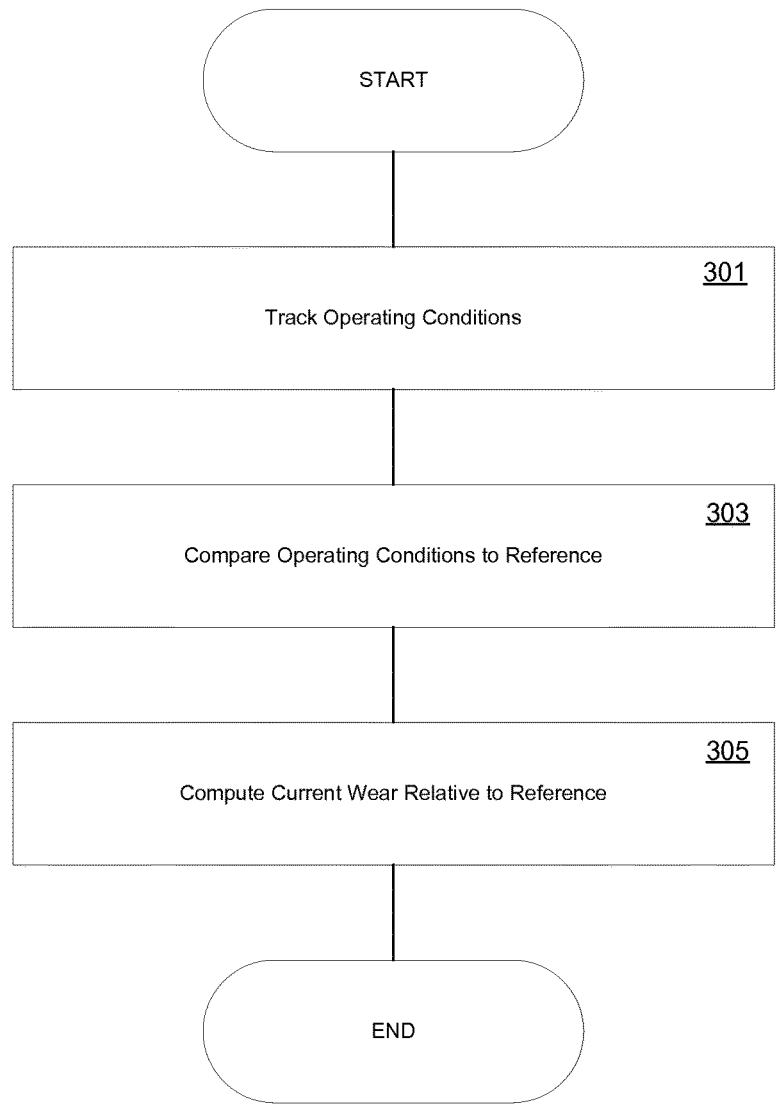
FIG. 3 depicts a flowchart of a process for determining wear in a computing system, in accordance with various embodiments of the present invention.

FIG. 3 depicts a flowchart of a process 300 for determining wear in a computing system, in accordance with various embodiments of the present invention. Steps 301-305 describe exemplary steps which may be performed during step 201 described above and depicted in FIG. 2. Process 300 may be employed when accumulated wear in a computing system cannot be measured directly, for example.

At step 301, operating conditions in a computing system are monitored and tracked over time. These conditions may include, as described above, the voltage supplied by a power supply device, the frequency or clock rate of a processor in the system, and/or the temperature of one or more components in the system. According to various embodiments, one or more components in the system may have corresponding junction temperatures. (e.g., temperatures at which the component is allowed to operate). According to such embodiments, temperature sensors comprised in the computing system constantly measure and monitor the junction temperatures of the one or more components during operation. When operating conditions within the computing system are such that the junction temperatures of the components meet a (pre-defined) max junction temperature, further increasing performance of the computing system (and thus, raising the junction temperature) may be prevented. Operating at high max junction temperatures or max junction temperatures above a pre-defined threshold may consume accumulated credits within the system. Likewise, operating below a default threshold or pre-determined max junction temperature may accumulate credits. Step 301 may be performed periodically, or in response to certain triggers (e.g., a peripheral device being installed or un-installed, certain timing milestones, etc.)

At step 303, the tracked operating conditions are compared to a pre-determined reference. According to various embodiments, the pre-determined reference may correspond to manufacturer design curves corresponding to the mean time before failure (MTBF) of an IC or IC component under varying operating conditions. In one embodiment, the pre-determined reference is a curve corresponding to absolute-worst-case conditions. According to another embodiment, the pre-determined reference is a curve corresponding to reasonable-worst-case conditions. Comparing the tracked operating conditions may comprise, for example, plotting the operating conditions with the reference curve and determining the difference between the plotted and reference curves.

Finally, at step 305, the current wear relative to the wear expected under the reference conditions is estimated by taking the difference, between one or more data points of the operating conditions in the computing system and the operating conditions along the reference curve at the same relative points of elapsed time. The difference between the curves may be expressed as a number of accumulated credits. According to an embodiment, credits may be cumulatively accumulated over the lifetime of the IC or IC product.

Alternatively, the current wear in a computing system may be calculated through the use of one or more dedicated circuits, such as oscillators and one or more transistors which are isolated from voltage-induced aging. In one embodiment, the oscillators may be configured to measure, at the beginning of the lifetime of the product, the condition of a transistor and to directly inspect the condition of the transistor periodically to determine the wear on the transistor. In further embodiments, the transistor may be isolated from voltage-induced aging by various conventionally-known techniques, such as power gating.

Figure 4:
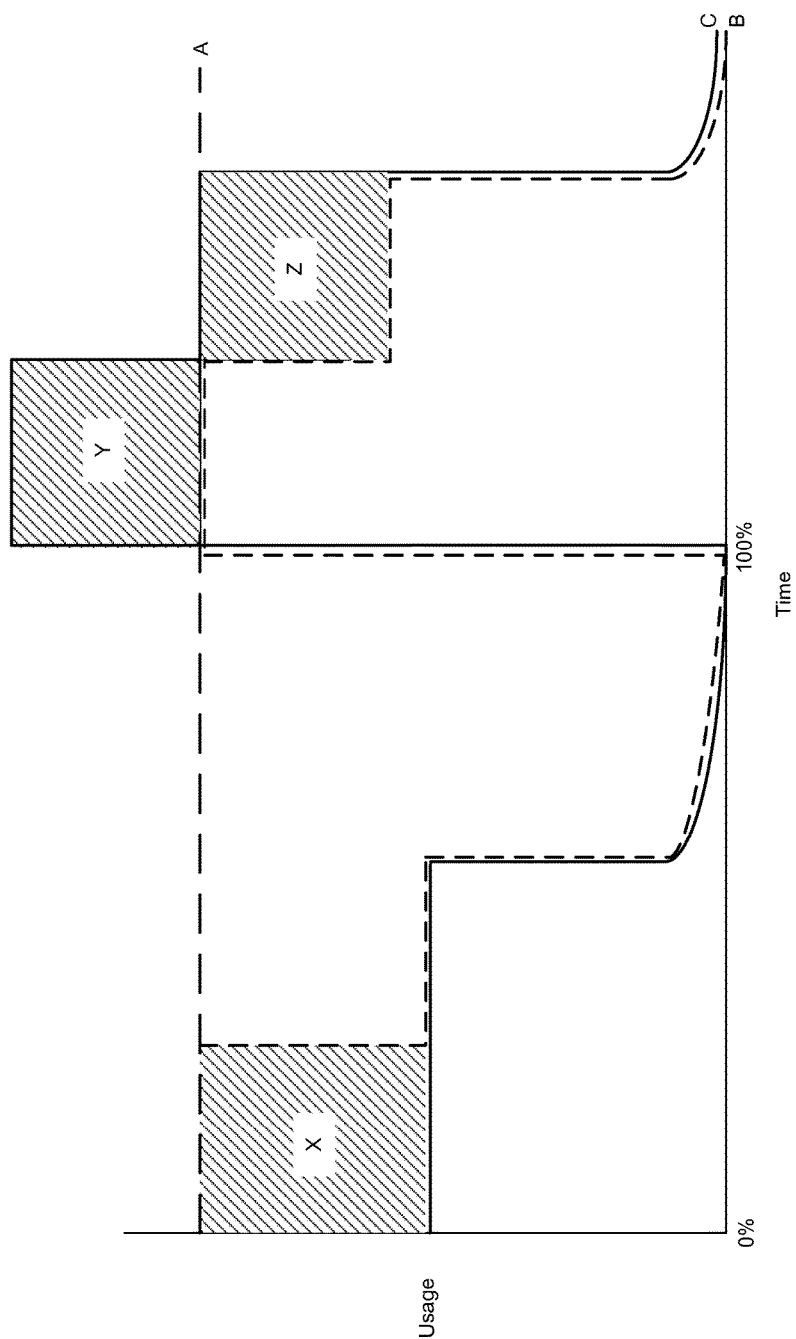
FIG. 4 depicts a line graph comparing exemplary usages over time in a system, in accordance with various embodiments of the present invention.

FIG. 4 depicts a line graph 400 comparing exemplary usages over time in a system, in accordance with various embodiments of the present invention. As depicted in FIG. 4, the y-axis represents usage of a computing system, whereas the x-axis represents the elapse of time, corresponding to the lifetime of an IC or IC product in a computing system. Line A represents the worst-case conditions contemplated in conventional processes for IC tolerance design. Lines B represents the "reasonable worst-case" conditions corresponding to expected conditions customized for intended use of an IC or IC product. Line C represents a set of conditions for an exemplary individual user of an IC or IC product.

As presented in FIG. 4, under the worst-case conditions scenario (A), usage is constant, and relatively high. Under the reasonable worst-case conditions scenario (B), usage may approach the same levels occasionally, but not with the same constancy or consistency. Likewise, conditions under an exemplary individual user (C) may never or only rarely approach the same level of usage during the actual lifetime of a product.

According to various embodiments of the invention, the difference in the amount of wear attributed to operating conditions between an individual user (C) and an absolute worst-case conditions scenario (A) or reasonable worst-case conditions scenario (B) may be tracked, accumulated, and represented as credits. These credits (represented as block X in FIG. 4) therefore represent the underutilization of an IC or IC product under operating conditions as budgeted by the manufacturer of the IC or IC product. When credits are accumulated, operating conditions within the computing system of the individual user may be adjusted to increase performance when desired. As depicted in FIG. 4, usage (and performance) of the computing system of the individual user (C) may be increased above the reasonable worst-case conditions scenario (B)—with the difference depicted as block Z—and even the absolute worst-case conditions scenario (A)—with the difference depicted as block Y—at a desired time. As presented in FIG. 4, this increase in performance may be employed even after the expected lifetime of the product.

Figure 5:
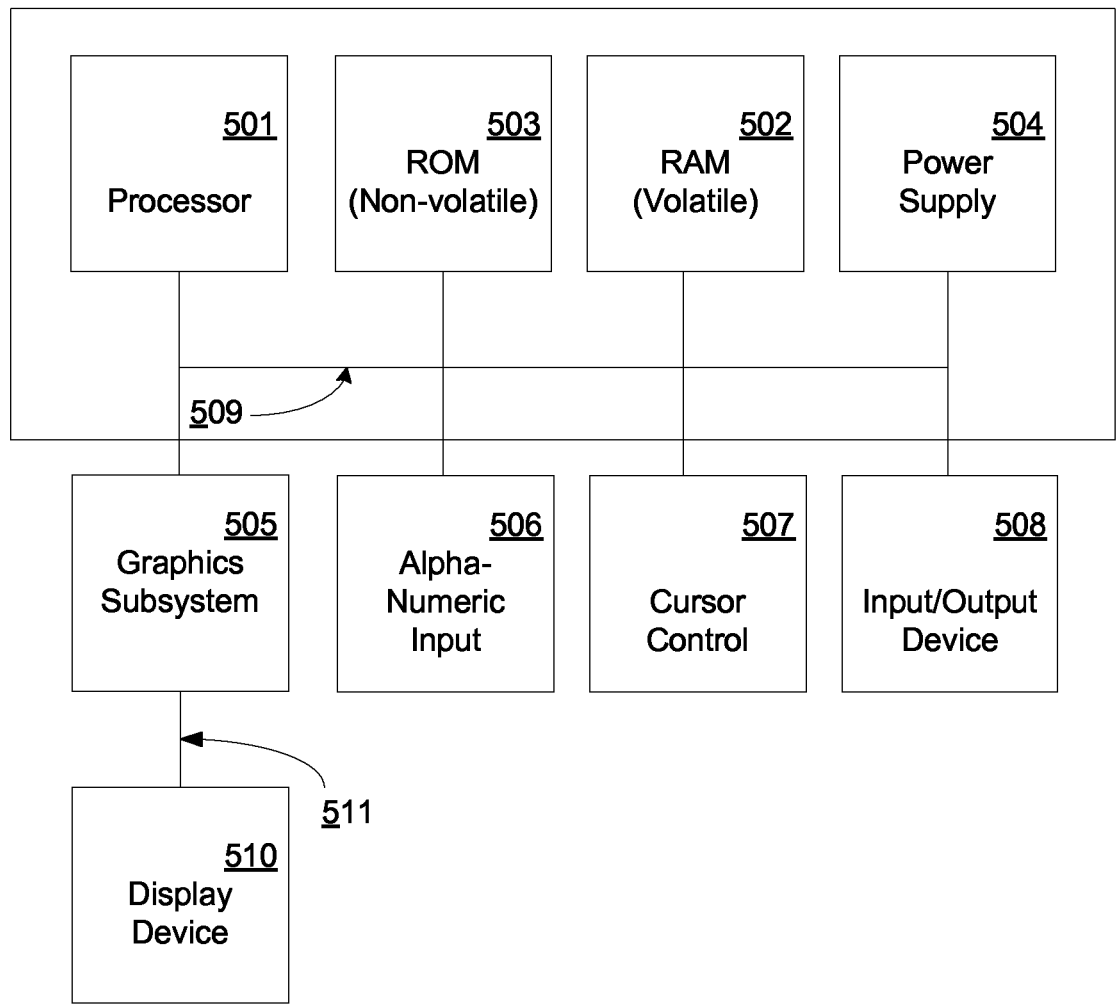
FIG. 5 depicts a block diagram of a general purpose computer system, upon which embodiments of the present invention may be implemented and/or performed.

As presented in FIG. 5, an exemplary system for implementing embodiments includes a general purpose computing system environment, such as computing system 500. In its most basic configuration, computing system 500 typically includes at least one processing unit 501 and memory, a power supply device 504, and an address/data bus 509 (or other interface) for communicating information. Depending on the exact configuration and type of computing system environment, memory may be volatile (such as RAM 502), non-volatile (such as ROM 503, flash memory, etc.) or some combination of the two. In an embodiment, the processing unit 501 operates at varying clock speeds, or frequencies, that determine the usage and operation of varying components, including ICs and IC products within the computing system 500. In an embodiment, the power supply device 504 supplies power (voltage) to the various components in the computing system 500. According to embodiments of the present invention, operating under both the frequencies corresponding to the clock speed of the processing unit 501, and the voltages supplied by the power supply device 504, as well as any increase in temperature directly or indirectly resulting from these conditions, may contribute to age-induced effects in ICs and IC products within the computing system 500.

Computer system 500 may also comprise an optional graphics subsystem 505 for presenting information to the computer user, e.g., by displaying information on an attached display device 510, connected by a video cable 511. In alternate embodiments, display device 510 may be integrated into the computing system (e.g., a laptop or netbook display panel) and will not require a video cable 511. In one embodiment, process 500 may be performed, in whole or in part, by graphics subsystem 505 and memory 502, with any resulting output displayed in attached display device 510.

Additionally, computing system 500 may also have additional features/functionality. For example, computing system 500 may also include additional storage (removable and/or non-removable) including, but not limited to, magnetic or optical disks or tape. Computer storage media includes volatile and nonvolatile, removable and non-removable media implemented in any method or technology for storage of information such as computer readable instructions, data structures, program modules or other data. RAM 502, ROM 503, and data storage device 504 are all examples of computer storage media.

Computer system 500 also comprises an optional alpha-numeric input device 506, an optional cursor control or directing device 507, and one or more signal communication interfaces (input/output devices, e.g., a network interface card) 508. Optional alphanumeric input device 506 can communicate information and command selections to central processor 501. Optional cursor control or directing device 507 is coupled to bus 509 for communicating user input information and command selections to central processor 501. Signal communication interface (input/output device) 508, also coupled to bus 509, can be a serial port. Communication interface 509 may also include wireless communication mechanisms. Using communication interface 509, computer system 500 can be communicatively coupled to other computer systems over a communication network such as the Internet or an intranet (e.g., a local area network), or can receive data (e.g., a digital television signal).

Accordingly, by providing methods and systems that provide the ability to track and account for wear in a computing device, operating conditions within the computing device may be adjusted such that the pre-built tolerances of varying ICs and IC components may be utilized with greater efficiency, and customized for particular usage reflective of the actual user of the device. Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
in response to an installation of a peripheral device in a computing system, directly measuring, with a plurality of dedicated circuits comprising a plurality of temperature sensors, operating conditions of a plurality of components comprised in the computing system, wherein the operating conditions comprise at least a temperature of the plurality of components during operation;
determining an amount of wear accumulated on the plurality of components based on the measured operating conditions;
calculating a number of accumulated credits for the computing system based on the determined amount of wear by plotting a first curve corresponding to the amount of wear and a second curve corresponding to a reference data and calculating the difference between the first and second curves;
adjusting operating conditions in the computing system based on the number of accumulated credits;
operating the computing system under adjusted operating conditions; and
increasing a frequency of said calculating said number of accumulated credits when said operating conditions are adjusted beyond a base performance level,
wherein operating conditions in the computing system are prevented from increasing beyond the base performance level until the number of accumulated credits is positive.

2. The method according to claim 1, wherein operating the computing system under adjusted operating conditions consumes accumulated credits of the computing system.

3. The method according to claim 2, wherein the computing system comprises a power supply device configured to supply power to the computing device,
further wherein adjusting the operating conditions comprises adjusting a voltage of the power supplied by the power supply device during operation.

4. The method according to claim 3, wherein adjusting the operating conditions comprises adjusting the voltage of the power supplied by the power supply device to a higher voltage or a lower voltage during operation.

5. The method according to claim 4, wherein adjusting the operating conditions comprises adjusting the voltage of the power supplied by the power supply device to a higher voltage during operation based on a remaining number of accumulated credits.

6. The method according to claim 2, wherein the computing system comprises a processor configured to operate at a frequency,
further wherein adjusting the operating conditions comprises adjusting a frequency of the processor during operation.

7. The method according to claim 6, wherein adjusting the operating conditions comprises adjusting the frequency of the processor during operation to a higher frequency or a lower frequency during operation.

8. The method according to claim 7, wherein adjusting the operating conditions comprises adjusting the frequency of the processor during operation to a higher frequency during operation based on a remaining number of accumulated credits.

9. The method according to claim 1, further comprising monitoring a junction temperature of a component comprised in the computing system during operation of the computing system.

10. The method according to claim 9, wherein the junction temperature of a component comprised in the computing system is not allowed to exceed a max junction temperature corresponding to the component.

11. The method according to claim 10, wherein adjusting the operating conditions comprises adjusting the max junction temperature corresponding to a component comprised in the computing system during operation to a higher max junction temperature or a lower max junction temperature during operation.

12. The method according to claim 11, wherein adjusting the operating conditions comprises adjusting the max junction temperature corresponding to a component comprised in the computing system to a higher max junction temperature during operation based on a remaining number of accumulated credits.

13. The method according to claim 1, wherein determining an amount of wear comprises:
tracking operating conditions of the computing system;
comparing the tracked operating conditions of the computing system to the reference data; and
computing a current wear in the computing system relative to the reference data.

14. The method according to claim 13, wherein computing the current wear in the computing system comprises mapping the operating conditions to a wear curve.

15. The method according to claim 13, wherein the reference data comprises a wear curve of a Mean Time Before Failure (MTBF) for the computing system for a worst case user.

16. The method according to claim 1, wherein the plurality of dedicated circuits comprises a plurality of oscillators and the plurality of components comprise a plurality of transistors isolated from voltage induced age,
further wherein the plurality of oscillators are configured to measure a condition of the plurality of transistors at the beginning of a lifetime of the computing system and to periodically inspect the condition of the plurality of transistors.

17. The method according to claim 1, wherein the plurality of components are isolated from voltage induced age by power-gating.

18. The method according to claim 1, further comprising adjusting operating conditions in the computing system at a predetermined time.

19. The method according to claim 18, wherein the adjusting operating conditions in the computing system at a predetermined time comprises automatically adjusting operating conditions once an expected lifetime of a component in the computing system is exceeded.

20. The method according to claim 1, further comprising adjusting operating conditions in the computing system in response to a trigger event in the computing system.

21. The method according to claim 13, wherein the reference data comprises design curve data specified by a manufacturer of a component corresponding to the computing device.

22. A computing system comprising:
a processor configured to process programmed instructions in the computing system at a plurality of frequencies;
a power supply device configured to supply power to the computing system at a plurality of voltages;

a plurality of components comprised in the computing system, wherein the plurality of components accumulate wear over time during operation of the computing system; and a plurality of dedicated circuits comprising a plurality of temperature sensors and configured to measure operating conditions of the plurality of components, wherein the operating conditions comprise at least a temperature of the plurality of components during operation, wherein the measured operating conditions are tracked over time and used to determine an accumulated wear on the components comprised in the computing system, wherein, operating conditions in the computing system and corresponding to at least one of the processor and the power supply device are adjusted based on a number of accumulated credits determined to correspond to the accumulated wear on the plurality of integrated circuits, further wherein the plurality of dedicated circuits are configured to measure the operating conditions in response to an installation of a peripheral device in the computing system.

23. The computing system according to claim 22, wherein a voltage of the power supplied by the power supply device during operation is adjusted based on the number of accumulated credits determined to correspond to the accumulated wear on the plurality of integrated circuits.

24. The computing system according to claim 22, wherein a frequency of the processor during operation is adjusted based on the number of accumulated credits determined to correspond to the accumulated wear on the plurality of integrated circuits.

25. The computing system according to claim 22,
wherein the plurality of components comprises a plurality of transistors isolated from voltage induced aging,
further wherein the plurality of dedicated circuits comprises a plurality of oscillators configured to measure a condition of the plurality of transistors at the beginning of a lifetime of the computing system and to periodically inspect the plurality of transistors for accumulated wear over time.

26. The computing system according to claim 25, wherein the number of accumulated credits corresponds to wear over time accumulated by the plurality of transistors.

27. The computing system according to claim 25, wherein the plurality of transistors are isolated from voltage induced aging by power gating the plurality of transistors.

28. The computing system according to claim 22, wherein the number of accumulated credits corresponding to the accumulated wear on the plurality of components is estimated by tracking operating conditions in the computing system, comparing the tracked operating conditions in the computing system to a reference, and computing a current position of the computing system relative to the reference.

29. The computing system according to claim 22, wherein the plurality of temperature sensors are configured to measure internal temperatures of the plurality of components comprised in the computing system.

30. The computing system according to claim 29, wherein the plurality of components have a corresponding plurality of max junction temperatures, the plurality of max junction temperatures comprising an operating temperature of the plurality of components not to be exceeded during operation of the computing system.

31. The computing system according to claim 30, wherein a max junction temperature of the plurality of max junction temperatures is adjusted based on the number of accumulated credits determined to correspond to the accumulated wear on the plurality of components.

32. A computing system comprising:
a processor configured to process programmed instructions in the computing system at a plurality of frequencies;
a power supply device configured to supply power to the computing system at a plurality of voltages; and
a plurality of components that accumulates wear over time during operation of the computing system; and
a plurality of dedicated circuits configured to measure, in response to an installation of a peripheral device in the computing system, operating conditions in a plurality of components comprised in the computing system, and to inspect the plurality of components for accumulated wear over time based on the measured operating conditions, wherein the plurality of dedicated circuits comprise a plurality of temperature sensors configured to measure a plurality of temperatures of the plurality of components,
wherein the computing system accumulates a plurality of operating credits while the computing system operates at a performance level under a pre-determined threshold by calculating a difference between a plot of wear corresponding to the performance level of the computing system in a first curve and a plot of wear corresponding to a reference data in a second curve at a frequency and determining a difference between the first and second curves, and consumes operating credits while the computing system operates at a performance level above the pre-determined threshold,
wherein, the computing system is further operable to operate at a performance level above the pre-determined threshold for so long as a surplus of the operating credits remains.

33. The computing system according to claim 32, wherein the performance level of the computing device is increased by increasing at least one of:
the voltage supplied by the power supply device, the processor frequency, and the junction temperature of a component.

34. The computing system according to claim 32, wherein the performance level of the computing device is decreased by decreasing at least one of: the voltage supplied by the power supply device, the processor frequency, and the junction temperature of a component.

35. The computing system according to claim 32, wherein the rate at which wear is accumulated by the plurality of components corresponds to the performance level of the computing system.

36. The computing system according to claim 35, wherein the accumulation of operating credits corresponds to an estimated level of wear accumulated by the plurality of components relative to a reference level of wear.

37. The computing system according to claim 36, wherein the level of wear accumulated by the plurality of components is estimated by tracking operating conditions in the computing system, comparing the tracked operating conditions in the computing system to a reference, and computing a current position of the computing system relative to the reference.

38. The computing system according to claim 32 wherein the number of accumulated operating credits is determined by inspecting the plurality of components for wear over time.

* * * * *